United States Patent [19]

Miller et al.

[11] 4,170,686

[45] Oct. 9, 1979

[54] SUBSTRATES AND ARTICLES OF MANUFACTURE INCORPORATING A FLUOROPOLYMER PRIMER COATING

[75] Inventors: William A. Miller, Bridgewater; John P. Opsasnick, Edison; William A. Miller, Parsippany, all of N.J.

[73] Assignee: Allied Chemical Corporation, Morris Township, Morris County, N.J.

[21] Appl. No.: 882,718

[22] Filed: Mar. 2, 1978

Related U.S. Application Data

[62] Division of Ser. No. 704,158, Jul. 12, 1976, Pat. No. 4,098,756.

[51] Int. Cl.$^2$ .................. B32B 15/08; B32B 27/30
[52] U.S. Cl. .................. 428/416; 428/246; 428/263; 428/273; 428/285; 428/327; 428/328; 428/421; 428/422; 428/443; 428/451; 428/447; 428/432; 428/426; 428/516; 526/247; 526/253
[58] Field of Search .................. 260/42.27; 428/416, 428/421, 422, 432, 443, 447, 426, 516; 526/253, 247

[56] References Cited

U.S. PATENT DOCUMENTS

| | | | |
|---|---|---|---|
| 2,961,341 | 11/1960 | Long | 428/422 |
| 2,979,418 | 4/1961 | Dipner | 428/261 |
| 3,019,206 | 1/1962 | Robb | 260/29.6 F |
| 3,365,355 | 1/1968 | Netsch | 428/416 X |
| 3,624,250 | 11/1971 | Carlson | 526/247 |
| 3,745,145 | 7/1973 | Khattab | 260/23 XA |
| 3,773,698 | 11/1973 | Khattab | 260/23 XA |
| 3,847,881 | 11/1974 | Mueller et al. | 526/253 |
| 3,853,690 | 12/1974 | McGarry et al. | 428/416 |
| 3,989,873 | 11/1976 | Robertson et al. | 428/422 |

*Primary Examiner*—P. C. Ives
*Attorney, Agent, or Firm*—Jay P. Friedenson

[57] ABSTRACT

This invention relates to substrates and articles of manufacture incorporating a fluoropolymer primer coating. The primer coating comprises a copolymer of ethylene and a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof, and containing from about 5 to 60 percent by weight of the total composition of an epoxy resin and from about 1 to 25 percent by weight of the total composition of an oxide of cobalt, nickel, manganese, tungsten or mixtures thereof.

12 Claims, No Drawings

SUBSTRATES AND ARTICLES OF MANUFACTURE INCORPORATING A FLUOROPOLYMER PRIMER COATING

This is division, of application Ser. No. 704,158, filed July 12, 1976 now U.S. Pat. No. 4,098,756.

BACKGROUND OF THE INVENTION

1. Field of the Invention

This invention relates to fluoropolymer primer compositions useful for coating substrates, particularly copolymers based on ethylene and a comonomer selected from the group consisting of chlorotrifluoroethylene, tetrafluoroethylene and mixtures thereof.

2. DESCRIPTION OF THE PRIOR ART

Copolymers of about 40 to about 60 mol percent ethylene and correspondingly from about 60 to about 40 mol percent of chlorotrifluoroethylene, tetrafluoroethylene and mixtures thereof, are known in the art as disclosed, for example, in Mueller et al. U.S. Pat. No. 3,847,881, issued Nov. 12, 1974. As described therein, such copolymers may contain 3,3,3-trifluoro-2-trifluoromethyl propene to improve their stress-crack resistance. Also, as described in Carlson U.S. Pat. No. 3,624,250 issued Nov. 30, 1971, such copolymers may contain certain vinyl monomers in order to improve their stress-crack resistance. Such copolymers have been suggested as being useful for coating articles by powder coating techniques. However, it has been found that the adhesion between such copolymer coatings and the underlying substrate, particularly in the case of metal substrates, is too weak for certain applications, especially those wherein a severe environment is encountered. U.S. Pat. patent application Ser. No. 563,012, filed May 27, 1975, now U.S. Pat. No. 3,989,873 describes primer coatings for such copolymers which include about about 1 to 40 percent by weight of an oxide of cobalt, nickel, manganese, chromium, tin, molybdenum, tungsten or mixtures thereof. The disclosure of such application is expressly incorporated herein by reference. Although such primer coatings are effective for bonding such copolymers to metal and other substrates, it has been found that upon long term exposure to high temperature wet environments, the bond strength of coated articles substantially decreases. It would be desirable to provide a primer coating composition and coated articles based on such copolymers which have improved high temperature wet environment bond strengths.

SUMMARY OF THE INVENTION

In accordance with one embodiment of the present invention, there are provided copolymers of ethylene, a halo-genated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof, and containing from about 5 to 60 percent by weight of the total composition of an epoxy resin and about 1 to 25 percent by weight of the total composition of an oxide of cobalt, nickel, manganese, tungsten or mixtures thereof. Such compositions are particularly useful as a primer coating for substrates such as metals, preferably in conjunction with an overlying layer of such copolymers. In accordance with another embodiment of the present invention, coated articles are provided which comprise a substrate, a primer coating fused thereon and comprising a copolymer of ethylene, a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof, and from about 5 to 60 percent by weight of the total composition of an epoxy resin and about 1 to 25 percent by weight of the total composition of an oxide of cobalt, nickel, manganese, tungsten or mixtures thereof, and an outer coating fused to the primer coating and comprising a copolymer of ethylene, a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof. Preferably, the substrate is a metal substrate and the copolymers of the primer and overlying layers are the same. It has been found that the use of such primer layers, especially those containing an oxide of cobalt, provides articles which have excellent bond strength even when exposed to prolonged high temperature wet environments.

DESCRIPTION OF THE PREFERRED EMBODIMENTS

As stated above, the copolymers of the present invention are known and may be prepared by known polymerization methods, such as are described in the aforesaid Mueller et al. and Carlson patents. The disclosure of both patents are specifically incorporated herein. Preferably, the copolymers contain from about 40 to about 60 mol percent of ethylene, from about 60 to about 40 mol percent of chlorotrifluoroethylene, tetrafluoroethylene or mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof. About equimolar copolymers of ethylene and chlorotrifluoroethylene or tetrafluoroethylene are particularly preferred.

The termonomers disclosed in Mueller et al. (i.e., 3,3,3-trifluoro-2-trifluoromethyl propene) and in Carlson (i.e., vinyl monomers) may optionally be present in the copolymer. Amounts of about 0.1 to about 10 mol percent, based on the total mols of the other monomers, may be employed. Preferably, about 0.5 to about 5 mol percent of such additional monomers are employed.

The monomers disclosed in Carlson are copolymerizable vinyl monomers that are free of telogenic activity and which provide a side chain having at least two carbon atoms and being either aromatic or having its elements bonded together only by single bonds. By "free of telogenic activity" is meant that the vinyl monomer does not act as a chain transfer agent to an extent which undesirably limits the molecular weight of the copolymer. Examples of such vinyl monomers include fluorinated alpha-monoolefins and those of the following formulae:

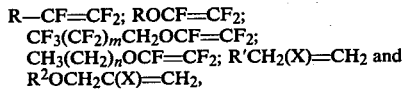

wherein R is an organic group containing 2 to 8 carbon atoms, R' is a perfluorinated or chlorofluoroalkyl group of 1 to 7 carbon atoms or a secondary or tertiary haloalcohol group, $R^2$ is a perfluorinated or chlorofluoroalkyl of 1 to 7 carbon atoms, X is H or $CH_2$, m is an integer of 0 to 6 and n is an integer of 1 to 7. Especially preferred vinyl monomers are perfluoropropyl perfluorovinyl ether, 1,1,1-trifluoro-2-(trifluoromethyl)-4-penten-2-ol and allyl heptafluoroisopropyl ether.

Preferred copolymers are those containing from about 40 to about 60 mol percent of ethylene and from about 60 to about 40 mol percent chlorotrifluoroethylene, especially about equimolar copolymers of such comonomers, as well as copolymers of ethylene and chlorotrifluoroethylene of the aforesaid mol content (and especially about an equimolar content) together with about 0.5 to 5 mol percent of 3,3,3-trifluoro-2-trifluoromethyl propene, and copolymers of ethylene and tetrafluoroethylene of the aforesaid mol content (and especially about an equimolar content) together with about 0.5 to 5 mol percent of perfluoropropyl perfluorovinyl ether.

The copolymers and terpolymers may include a high molecular weight fraction as is disclosed in copending U.S. applications Ser. Nos. 564,232 filed Apr. 2, 1975, now U.S. Pat. No. 4,020,253 and 649,936 filed Jan. 19, 1976, now U.S. Pat. No. 4,033,939, the disclosures of which are expressly incorporated herein by reference. For example, the copolymers and terpolymers may contain about 0.5 to 60 weight percent of a high molecular weight component which has a melt index per ASTM D-1238 at 275° C. of about 0.0001 to 1.0, preferably about 0.005 to 0.5, and about 99.5 to 40 weight percent of a low molecular weight component which has a melt index of about 3 to 3000, preferably about 5 to 1000.

The copolymer primer compositions include from about 5 to 60 weight percent, based on the total weight of the composition, of an epoxy resin, and preferably from about 25 to 50 weight percent of such resin. The epoxy resins useful herein may be any of the known adhesive epoxy resins. Such resins may be prepared by the condensation of epoxy compounds, such as epichlorohydrin and glycerol dichlorohydrin, with polyhydric organic compounds such as alcohols, e.g., pentaerythritol; dihydric alcohols, e.g., glycerol; dihydric phenols, e.g., bisphenol A; and trihydric phenols. For example, epoxy resins prepared by the condensation of bisphenol A and epichlorohydrin may be employed. Other types of epoxy resins include diglycidyl ether of bisphenol A, the epoxidized novolac resins such as epoxy cresol novolac and epoxy phenol novolac. Still other epoxy resins include the cycloaliphatic resins in which the epoxide groups are attached directly to the cycloaliphatic portions of the molecule rather than on the alkyl chain.

The above epoxy resins include hardeners and/or accelerators which permit their curing at elevated temperature. Such catalysts include Lewis bases such as tertiary amines (e.g., benzyldimethylamine) and imidazoles, and Lewis bases such as boron trifluoride complexes with monoethylamine. Hardeners (cross-linking agents) include primary and secondary amines (e.g., diethylene triamine and triethylene tetramine), polyamides, polyesters, carboxylic acids, anhydrides (such as maleic anhydride), phenolic compounds and alcohols. The concentration of such additives may vary widely depending upon the desired properties in the cured material.

Such epoxy resins are commercially available as liquids or solids. When solid epoxy resins are employed they are preferably in the form of aqueous emulsions or as solutions in suitable volatile solvents such as ketonic solvents, e.g., methyl ethyl ketone, methyl isobutyl ketone and the like; cyclic ethers such as tetrahydrofuran, etc. It has been found desirable to utilize the epoxy resin as a solution in a volatile solvent since better bonding to substrates such as metals results.

The copolymer primer compositions also include from about 1 to 25 weight percent, preferably from about 5 to 15 weight percent, of an oxide of cobalt, nickel, manganese, tungsten or mixtures thereof. Cobalt oxide is preferred and is employed in the form of cobaltic oxide ($Co_2O_3$), although cobaltous oxide (CoO) and cobalto-cobaltic oxide ($Co_3O_4$) may also be used as well as mixtures of any two or more forms of cobalt oxide. The cobalt and other oxides are preferably employed in powder form.

It has been found that such compositions, especially compositions in which the copolymer is an approximate equimolar copolymer of ethylene and chlorotrifluoroethylene and containing 3,3,3-trifluoro-2-trifluoromethyl propene, are effective primer coatings for metal and other substrates. The incorporation of the epoxy resins and cobalt oxides in the primer composition provides coated articles in which the outer coating is firmly adhered to the substrate.

The compositions of the present invention may be prepared by any suitable technique known for preparing blended thermoplastic compositions. Preferably, the epoxy resin in a suitable solvent is blended with pellets or powder of the copolymer in a ribbon blender, v-cone blender or like apparatus and the solvent is removed by evaporation, vacuum or other means. Thereafter, the cobalt oxide, also preferably in powder form, is blended into the mixture on the same equipment. If necessary, the final mixture may be milled to the desired size depending upon the desired method of application.

The copolymer compositions are preferably in a powder form and any of the well-known powder coating techniques may be employed to coat the compositions onto the substrate. These techniques include electrostatic deposition and fluidized bed and similar techniques. As these methods are conventional they are not specifically described herein. It is preferred to use an electrostatic deposition coating process. As is well known, this process provides initial adherence of a powder composition to a substrate and the substrate is thereafter subjected to a heat treatment above the melting point of the powder to fuse or coalesce ("flow out") the particles of the powder into a continuous layer. In forming the coated articles of this invention, it is preferred to employ flow out temperatures in the range of about 400° to 700° F., preferably about 500° to 550° F. for copolymers based on ethylene and chlorotrifluoroethylene and about 450° to 800° F., preferably about 575° to 650° F. for copolymers based on ethylene and tetrafluoroethylene or mixtures with chlorotrifluoroethylene. The duration of this heating step is dependent upon a number of factors, including the temperature employed, the coating thickness, the type of substrate, etc. In general, flow out times may conveniently be in the order of 1 or 2 minutes to 1 or 2 hours or more. Upon exposure to the elevated temperature, the epoxy resin crosslinks to provide firm adhesion to the substrate.

After a continuous primer coating is formed over the substrate, a layer of particles of the outer coating may be likewise deposited on the primer coating and then heated to flow out such particles into a continuous coating which is fused to the surface of the primer layer. The composition used to form the outer coating obviously need not include the epoxy resin or the cobalt oxide. Preferably, the copolymer used in the primer and outer coatings is the same. In certain cases, it may be desirable to omit the outer coating. Alternatively, the outer layer may be deposited on the primer layer before the latter is flowed out, so that only one flow out step need be employed.

The primer composition and the outer copolymer composition may include any of the conventional additives usually incorporated into such copolymer compositions. Such additives include inert fillers, stabilizers, pigments, reinforcing agents, lubricants and the like. For example, the four component stabilizing system described in U.S. Pat. No. 3,773,698 to Khattab (1973), or the three component stabilizing system described in U.S. Pat. No. 3,745,145 to Khattab et al. (1973), for about equimolar ethylenechlorotrifluoroethylene copolymer compositions may be employed herein.

The various substrates capable of being coated in accordance with this invention include, for example, a metal surface such as surfaces of steel, aluminum, iron, zinc, cadmium, magnesium, brass, bronze, Monel, Inconel; fabrics that will withstand the baking temperatures required, such as fiber glass fabrics, asbestos fabrics, metal fabrics and the like, as well as glass and any plastic surface which will withstand high temperatures required herein without degrading. Examples of such plastic surfaces include thermosetting resins, polyurethanes, silicones, fluoroelastomers and the like.

The type of metal or other material employed as the base layer is not critical and is dictated by the desired end use of the coated article. Especially preferred substrates are those formed of brass, bronze, aluminum, stainless steel and carbon steel. Likewise, the thickness of the substrate is not critical and is dependent upon design factors.

It is preferred to pretreat metal substrates prior to coating with the primer layer to obtain a roughened surface in order to achieve a stronger adherence of the primer coating to the substrate. Any suitable surface treatment can be employed for this purpose such as sand or grit blasting, etching, etc.

The coating itself may be deposited upon the substrate in any desired thickness. In forming thick coatings (e.g. 1 mil or above) it may be desirable to employ a plurality of thin layers as is conventional in order to improve the uniformity and integrity of the coating. This of course requires additional exposure of the underlying coatings to high temperatures and for this reason it is preferred to include stabilizing agents in the coating compositions.

Substrates which are coated according to this invention have coated surfaces which are continuous and pinhole-free. The coatings may be employed as protective as well as antistick surfaces. Exemplary of articles which may be coated include wire and cable; cookware, industrial tubing, pipes, pumps and tanks, and drier rollers as well as other articles which require coatings having high strength at elevated temperatures, resistance to chemical attack, good electrical insulating properties, nonsticking surfaces, abrasion and scratch resistance and firm adherence of the coating.

The coated articles of this invention preferably include the substrate, a layer of the primer composition of the thickness of about 0.5 to 20 mils, preferably about 1 to 10 mils, and an overlying layer of the copolymer composition having a thickness of about 0.5 to 500 mils, preferably about 3 to 50 mils.

The present invention provides a single primer layer which includes both cobalt oxide and an epoxy resin. It has been found that such primer layer provides excellent high temperature wet strength properties to coatings of such copolymers in an economic manner. This is especially surprising since it has been indicated in the prior art that two separate primer layers are necessary in order to provide adequate adhesion of perfluorohaloolefin polymers such as polychlorotrifluoroethylene. U.S. Pat. No. 2,979,418 to Dipner (1961) suggests a primer system for such perfluorohaloolefin polymers (which do not include the subject copolymers) including a first primer layer comprising the polymer and an adhesive resin such as an epoxy and/or phenolic resin and a second primer layer which includes the polymer and a metal oxide of a metal above the fourth group of the periodic table, such as cobalt oxide. However, it has been found, as indicated in Example 12 below, that in contrast to the present invention, such a primer system does not provide adequate adhesion properties for the copolymers of this invention.

U.S. Pat. No. 2,961,341 to Long (1960) also suggests primers for perfluorohaloolefins (as opposed to the present copolymers) but such primer layer only includes cobalt oxide. U.S. Pat. No. 3,019,206 to Robb (1962) suggests latex polyblends of polytetrafluoroethylene and fluorine-containing elastomers as useful coating materials. Among the heat stabilizers suggested for such blends is cobalt oxide. Although copolymers are also suggested, all of the copolymers are fluorinated or are perfluorohaloolefins. It is quite clear that this patent does not suggest the incorporation of cobalt oxide and an epoxy resin into a copolymer based on ethylene and trifluoroethylene, chlorotrifluoroethylene or mixtures thereof as adhesion promoters to provide a primer coating composition.

In order to further describe the present invention, the following non-limited examples are given. All parts and percentages are by weight.

EXAMPLES 1-10

An equimolar ethylene-chlorotrifluoroethylene copolymer containing about 2 mol percent of hexafluoroisobutylene, and having a melt index of 8 to 14, was blended in powder form with a liquid epoxy resin sold by M & T Chemicals as M & T primer 252 P in a weight ratio of 65% epoxy solution to 35% fluoropolymer. The epoxy solution contained about 25 weight percent solids so that after drying the composition contained about 32 weight percent epoxy resin and 68 weight percent fluoropolymer. The mixture was dried in air for 48 hours and then dried in a vacuum oven for 16 hours at 160° F. to remove the solvents. The resultant cake was milled on a micropulverizer after which 10 weight percent cobalt oxide powder, based on the total weight of the composition, was added and the composition remilled to a particle size of about 60 microns.

Panels of various metal substrates measuring 8×8×¼ inch were grit blasted with 60 grit aluminum oxide. The substrates were preheated to 600° F. and coated with the primer composition by electrostatic deposition. The primer coated panels were then powder coated by the same technique with the same fluoropolymer used to prepare the primer coat (but without the epoxy and oxide). The coated panels were vertically supported in an electrically heated air oven and the powder coatings were flowed out at 500° to 530° F. for about 10 minutes.

The coated panels were subjected to a high pressure steam environment to determine the resistance and adherence of the coating. The coated plaques were exposed to 50 psig steam with a six inch diameter circle of the coating in contact with the steam. Following the test, the samples were examined for blisters or lift off of the coating. The results are shown in Table 1, below. In the Table, E-CTFE refers to the fluoropolymer.

that the primer composition is not the limiting factor for coating integrity.

EXAMPLES 11–12

In Example 11, Example 7 was repeated on an 8×8×¼ inch brass panel which was then subjected to the 50 psig steam test. The adhesion was good after 24 hours. In Example 12 (comparative), Example 7 was repeated with two primer coats as suggested in the aforementioned U.S. Pat. No. 2,979,418. The first primer coat contained 32% by weight of the epoxy resin and no cobalt oxide and was applied to a thickness of about 3–5 mils. The second primer coat contained 20% by weight cobalt oxide and no epoxy and was applied to about the same thickness. An outer coating was employed as before. In the knife test, the coating could be completely lifted off from the brass, which indicates that the prior art primer system would not provide adequate adhesion in high temperature wet environments. These examples demonstrate the unexpected improvement in adhesion resulting from the present invention.

EXAMPLES 13 to 16

Example 1 is repeated except that the primer composition includes, at 10 weight percent levels, nickel oxide, manganese oxide, tungsten oxide in Examples 13 to 15,

TABLE 1

| Example | Substrate | Primer Composition, % | | | Primer Thickness, mils | Outer Coating Thickness, mils | Adhesion Properties |
| --- | --- | --- | --- | --- | --- | --- | --- |
| | | E-CTFE | Epoxy | Cobalt Oxide | | | |
| 1 | carbon steel | 61 | 29 | 10 | 6 | 24 | Good bond after 100 hours of steam |
| 2 | carbon steel | 47 | 43 | 10 | 6 | 24 | Good bond after 100 hours of steam |
| 3 | carbon steel | 76 | 14 | 10 | 6 | 24 | One large blister and many small bubbles after 22 hours of steam |
| 4 | carbon steel | 83 | 7 | 10 | 6 | 24 | Many blisters after 22 hours of steam |
| 5 | carbon steel | 80 | 0 | 20 | 6 | 24 | Complete lift-off of coating after 16 hours of steam |
| 6 | carbon steel | 61 | 29 | 10 | 6 | 24 | Good adhesion after 1000 hours of steam but outer coating stress cracked |
| 7 | brass | 61 | 29 | 10 | 6 | 24 | Good adhesion by knife test |
| 8 | stainless steel | 61 | 29 | 10 | 6 | 24 | Good adhesion by knife test |
| 9 | aluminum | 61 | 29 | 10 | 6 | 24 | Good adhesion by knife test |
| 10 | bronze | 61 | 29 | 10 | 6 | 24 | Good adhesion by knife test |

As can be seen from Table 1, the primer compositions of this invention provide good bond strength upon long term exposure to steam. Comparative Example 5 demonstrates the poor adhesion with primer compositions that do not contain epoxy resin. The incorporation of 7% of epoxy (Example 4) provided better adherence than the comparative example and the incorporation of 14% epoxy (Example 3) provided further improvement. Examples 1 and 2 demonstrate the excellent results obtained with 29% and 43% epoxy, respectively. The knife test referred to in the Table was conducted by cutting an x shape into the coating of a 2×4×¼ inch panel and attempting to separate the coating from the metal substrate with a knife. Example 6 demonstrates respectively, and a mixture of 5 weight percent cobalt oxide and 5 weight percent nickel oxide in Example 16. Similar results are noted.

EXAMPLE 17

Example 1 is repeated except that the copolymer was an approximate equimolar copolymer of ethylene and tetrafluoroethylene. Similar results are noted.

EXAMPLE 18

Example 17 is repeated except that the copolymer included 3 mol percent of perfluoropropyl perfluorovinyl ether. Similar results are obtained.

EXAMPLE 19

Example 1 is repeated except that the copolymer was an approximate equimolar copolymer of ethylene and chlorotrifluoroethylene. Similar results are noted.

It is to be understoodd that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

What is claimed is:

1. A substrate coated with a composition comprising a copolymer of ethylene, chlorotrifluoroethylene and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof, and containing from about 5 to 60 percent by weight of the composition of an epoxy resin and about 1 to 25 percent by weight of the composition of an oxide of cobalt, nickel, manganese, tungsten and mixtures thereof.

2. A substrate coated with a composition comprising a copolymer of ethylene, tetrafluoroethylene and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof, and containing from about 5 to 60 percent by weight of the composition of an epoxy resin and about 1 to 25 percent by weight of the composition of an oxide of cobalt, nickel, manganese, tungsten and mixtures thereof.

3. An article of manufacture which comprises a substrate, a primer coating fused thereon and comprising a copolymer of ethylene, a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof, and containing from about 5 to 60 percent by weight of the composition of an epoxy resin and from about 1 to 50 percent by weight of the composition of an oxide of cobalt, nickel, manganese, tungsten or mixtures thereof, and an outer coating fused to said primer coating and comprising a copolymer of ethylene, a halogenated comonomer selected from the group consisting of tetrafluoroethylene, chlorotrifluoroethylene and mixtures thereof and 0 to 10 mol percent of an additional monomer selected from the group consisting of 3,3,3-trifluoro-2-trifluoromethyl propene, a vinyl monomer which is free of telogenic activity and which provides a side chain having at least two carbon atoms, said side chain being aromatic or having its elements bonded together by a single bond only, or mixtures thereof.

4. An article in accordance with claim 3 wherein said copolymer of said primer coating is a copolymer of about 40 to about 60 mol percent ethylene and correspondingly from about 60 to about 40 mol percent of tetrafluoroethylene, chlorotrifluoroethylene or mixtures thereof.

5. An article in accordance with claim 4 wherein said halogenated comonomer is chlorotrifluoroethylene.

6. An article in accordance with claim 5 wherein said copolymer comprises from about 0.1 to 10 mol percent of 3,3,3-trifluoro-2-trifluoromethyl propene.

7. An article in accordance with claim 6 wherein said epoxy resin is present in an amount of about 25 to about 50 weight percent.

8. An article in accordance with claim 7 wherein said oxide is cobalt oxide and is present in an amount of about 5 to 15 percent by weight.

9. An article in accordance with claim 8 wherein said copolymer of said outer coating comprises from about 40 to about 60 mol percent of ethylene and correspondingly from about 60 to about 40 mol percent of chlorotrifluoroethylene and about 0.1 to about 10 mol percent of 3,3,3-trifluoro-1-trifluoromethyl propene.

10. An article in accordance with claim 9 wherein said substrate is a metal.

11. An article in accordance with claim 10 wherein said metal is brass.

12. An article in accordance with claim 1 wherein said oxide is cobalt oxide.

* * * * *